US009618948B2

(12) United States Patent
Yamaguchi et al.

(10) Patent No.: US 9,618,948 B2
(45) Date of Patent: Apr. 11, 2017

(54) APPLIANCE CONTROL SYSTEM AND REMOTE CONTROLLER (71) Applicant: Panasonic Corporation, Osaka (JP)

(72) Inventors: Hideaki Yamaguchi, Osaka (JP); Akihiko Hiroishi, Osaka (JP); Makoto Kawasaki, Osaka (JP); Satoshi Kitamura, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 415 days.

(21) Appl. No.: 14/356,272

(22) PCT Filed: Nov. 8, 2012

(86) PCT No.: PCT/JP2012/007170
§ 371 (c)(1),
(2) Date: May 5, 2014

(87) PCT Pub. No.: WO2013/069286
PCT Pub. Date: May 16, 2013

(65) Prior Publication Data
US 2014/0249681 A1 Sep. 4, 2014

(30) Foreign Application Priority Data
Nov. 8, 2011 (JP) .................................. 2011-244559

(51) Int. Cl.
G05B 15/00 (2006.01)
G05D 23/19 (2006.01)
(Continued)

(52) U.S. Cl.
CPC ......... *G05D 23/1927* (2013.01); *G08C 17/02* (2013.01); *H04Q 9/00* (2013.01);
(Continued)

(58) Field of Classification Search
None
See application file for complete search history.

(56) References Cited

U.S. PATENT DOCUMENTS 7,596,431 B1* 9/2009 Forman ............... G06F 11/3034
700/11
2002/0082924 A1* 6/2002 Koether ................ G06Q 10/06
705/15

(Continued)

FOREIGN PATENT DOCUMENTS

JP 2003-087275 A 3/2003
JP 2004-166193 A 6/2004
(Continued)

OTHER PUBLICATIONS

International Search Report for corresponding International Application No. PCT/JP2012/007170 mailed Jan. 22, 2013.
(Continued)

*Primary Examiner* — Adam Lee
(74) *Attorney, Agent, or Firm* — Renner, Otto, Boisselle & Sklar, LLP (57) ABSTRACT An appliance control system includes: a sensor (3) that detects environmental data of a surrounding environment; a plurality of appliances (2) as control targets; a remote controller including: a display unit (15) that displays a list of the appliances (2); an input unit (16) that receives an operation of controlling the appliances (2); a storage unit (13) that stores a threshold value in the environmental data for each of the plurality of appliances (2); and a processing unit (12) that gives higher priority to an appliance in which the environmental data has exceeded a threshold value, the priority being concerned with a display order of the appliance (2) on the display unit (15).

15 Claims, 4 Drawing Sheets (51) Int. Cl.
*G08C 17/02* (2006.01)
*H04Q 9/00* (2006.01)

(52) U.S. Cl.
CPC ..... *G08C 2201/30* (2013.01); *G08C 2201/92* (2013.01); *H04Q 2209/40* (2013.01); *H04Q 2209/50* (2013.01); *H04Q 2209/823* (2013.01)

(56) References Cited

U.S. PATENT DOCUMENTS

| | | | | |
|---|---|---|---|---|
| 2004/0015575 | A1* | 1/2004 | Motoyama | H04W 48/14 709/222 |
| 2004/0121725 | A1 | 6/2004 | Matsui | |
| 2006/0129691 | A1* | 6/2006 | Coffee | H04L 67/04 709/230 |
| 2006/0271618 | A1* | 11/2006 | Kokubo | H04M 1/72586 709/202 |
| 2007/0144187 | A1* | 6/2007 | Lee | F25B 47/025 62/155 |
| 2007/0146160 | A1 | 6/2007 | Takeshita | |
| 2009/0278853 | A1* | 11/2009 | Ueda | G06F 17/2735 345/581 |
| 2010/0150450 | A1* | 6/2010 | Tsuji | H04N 5/232 382/195 |
| 2010/0282910 | A1* | 11/2010 | Stothers | H02J 3/14 244/134 D |
| 2011/0161712 | A1* | 6/2011 | Athalye | G06F 1/206 713/340 |
| 2012/0143390 | A1* | 6/2012 | Miwata | F04D 19/042 700/300 |
| 2012/0216101 | A1* | 8/2012 | Yonemoto | G06F 17/30035 715/206 |
| 2012/0254842 | A1* | 10/2012 | Henderson | G06F 8/24 717/136 |
| 2012/0319869 | A1* | 12/2012 | Dorfmann | G08B 21/06 340/945 |
| 2013/0154839 | A1* | 6/2013 | Barton | F24F 11/0086 340/584 |
| 2015/0039135 | A1* | 2/2015 | Mori | H02J 3/14 700/276 |

FOREIGN PATENT DOCUMENTS

| | | |
|---|---|---|
| JP | 2007-181068 A | 7/2007 |
| JP | 2010-041344 A | 2/2010 |

OTHER PUBLICATIONS

Form PCT/ISA/237 for corresponding International Application No. PCT/JP2012/007170 dated Jan. 22, 2013.

* cited by examiner

| NUM- BER | APPLI- ANCE NAME | NUMBER OF OP- ERATION TIMES (MORNING) | NUMBER OF OP- ERATION TIMES (DAY) | NUMBER OF OP- ERATION TIMES (NIGHT) | NUMBER OF OP- ERATION TIMES (TOTAL) | SENSOR THRESHOLD VALUE | PRIORITY |
|---|---|---|---|---|---|---|---|
| 1 | ELECTRIC HEATER | 10 | 2 | 12 | 24 | 13°C OR LESS | × |
| 2 | AIR CON- DITIONER | 2 | 1 | 5 | 8 | 12°C OR LESS, 28°C OR MORE | × |
| 3 | FLOOR HEATING | 0 | 6 | 2→3 | 8→9 | 15°C OR LESS | × |
| | | | | | | | |

FIG. 5

| NUM- BER | APPLI- ANCE NAME | NUMBER OF OP- ERATION TIMES (MORNING) | NUMBER OF OP- ERATION TIMES (DAY) | NUMBER OF OP- ERATION TIMES (NIGHT) | NUMBER OF OP- ERATION TIMES (TOTAL) | SENSOR THRESHOLD VALUE | PRIORITY |
|---|---|---|---|---|---|---|---|
| 1 | ELECTRIC HEATER | 10 | 2 | 12 | 24 | 13°C OR LESS | × |
| 2 | FLOOR HEATING | 2 | 1 | 5 | 8 | 15°C OR LESS | × |
| 3 | AIR CON- DITIONER | 1 | 0 | 2 | 3 | 12°C OR LESS, 28°C OR MORE | × |
| | | | | | | | |

FIG. 6

| NUM- BER | APPLI- ANCE NAME | NUMBER OF OP- ERATION TIMES (MORNING) | NUMBER OF OP- ERATION TIMES (DAY) | NUMBER OF OP- ERATION TIMES (NIGHT) | NUMBER OF OP- ERATION TIMES (TOTAL) | SENSOR THRESHOLD VALUE | PRIORITY |
|---|---|---|---|---|---|---|---|
| 1 | ELECTRIC HEATER | 10 | 2 | 12 | 24 | 13°C OR LESS | × |
| 2 | FLOOR HEATING | 2 | 1 | 5 | 8 | 15°C OR LESS | × |
| 3 | AIR CON- DITIONER | 1 | 0 | 2 | 3 | 12°C OR LESS, 28°C OR MORE | ○ |
| | | | | | | | |

FIG. 7

| NUM-BER | APPLI-ANCE NAME | NUMBER OF OP-ERATION TIMES (MORNING) | NUMBER OF OP-ERATION TIMES (DAY) | NUMBER OF OP-ERATION TIMES (NIGHT) | NUMBER OF OP-ERATION TIMES (TOTAL) | SENSOR THRESHOLD VALUE | PRIORITY |
|---|---|---|---|---|---|---|---|
| 1 | ELECTRIC HEATER | 10 | 2 | 0 | 12 | 13°C OR LESS | × |
| 2 | FLOOR HEATING | 0 | 8 | 0 | 8 | 15°C OR LESS | × |
| 3 | AIR CONDITIONER | 1 | 0 | 7 | 8 | 12°C OR LESS, 28°C OR MORE | × |
|   |   |   |   |   |   |   |   |

FIG. 8

| NUM-BER | APPLI-ANCE NAME | NUMBER OF OP-ERATION TIMES (MORNING) | NUMBER OF OP-ERATION TIMES (DAY) | NUMBER OF OP-ERATION TIMES (NIGHT) | NUMBER OF OP-ERATION TIMES (TOTAL) | SENSOR THRESHOLD VALUE | PRIORITY |
|---|---|---|---|---|---|---|---|
| 1 | ELECTRIC HEATER | 0 | 8 | 0 | 8 | 15°C OR LESS | × |
| 2 | FLOOR HEATING | 10 | 2 | 0 | 12 | 13°C OR LESS | × |
| 3 | AIR CONDITIONER | 1 | 0 | 7 | 8 | 12°C OR LESS, 28°C OR MORE | × |
|   |   |   |   |   |   |   |   |

FIG. 9

| NUM-BER | APPLI-ANCE NAME | NUMBER OF OP-ERATION TIMES (MORNING) | NUMBER OF OP-ERATION TIMES (DAY) | NUMBER OF OP-ERATION TIMES (NIGHT) | NUMBER OF OP-ERATION TIMES (TOTAL) | SENSOR THRESHOLD VALUE | PRIORITY |
|---|---|---|---|---|---|---|---|
| 1 | ELECTRIC HEATER | 1 | 0 | 7 | 8 | 12°C OR LESS, 28°C OR MORE | × |
| 2 | FLOOR HEATING | 10 | 2 | 0 | 12 | 13°C OR LESS | × |
| 3 | AIR CONDITIONER | 0 | 8 | 0 | 8 | 15°C OR LESS | × |
|   |   |   |   |   |   |   |   |

APPLIANCE CONTROL SYSTEM AND REMOTE CONTROLLER

TECHNICAL FIELD

The present invention relates to an appliance control system and a remote controller, which control a plurality of appliances in a network.

BACKGROUND ART

In a so-called home network or the like, which integrates and manages appliances in a predetermined range, an appliance control system, which controls appliances as control targets, is known. By a remote controller (operation terminal) including a display unit that displays appliances in a network, the appliance control system as described above can control the displayed appliances (refer to Patent Literature 1).

In the appliance control system as described above, when the number of appliances which can be the control targets is increased, it becomes difficult to display a list of the appliances on the display unit at one time. For this, the remote controller generates a plurality of pages on a display screen, and switches the pages, and can thereby make it possible to select an appliance that should be controlled.

CITATION LIST

Patent Literature

Patent Literature 1: Japanese Patent Laid-Open Publication No. 2003-87275

SUMMARY OF INVENTION

In a case where the number of appliances which can be the control targets, is increased and a plurality of pages of a selection screen are present, in an event where an appliance as an object is operated, the number of times of a remote controller operation for switching the page is increased, resulting in an apprehension that convenience for a user may be lost.

It is an object of the present invention to provide an appliance control system and a remote controller, which are capable of enhancing the convenience for the user.

In order to achieve the foregoing object, a first aspect of the present invention is summarized to be an appliance control system including: a sensor that detects environmental data of a surrounding environment; a plurality of appliances as control targets; a display unit that displays a list of the appliances; a remote controller including: an input unit that receives an operation of controlling the appliances; a storage unit that stores a threshold value in the environmental data for each of the plurality of appliances; and a processing unit that gives higher priority to an appliance in which the environmental data has exceeded a threshold value, the priority being concerned with a display order of the appliance on the display unit.

An appliance control system according to a second aspect of the present invention is characterized in that, in the appliance control system according to the first aspect, the input unit is capable of setting the threshold value which the storage unit stores.

An application control system according to a third aspect of the present invention is characterized in that, in the appliance control system according to either one of the first and second aspects, the storage unit stores the number of operation times of the input unit for the appliance for each of the plurality of appliances, and in a case where a plurality of the appliances, in which the environmental data have exceeded the threshold value, are present, the processing unit sequentially gives still higher priorities to appliances in each of which the number of operation times is larger.

An application control system according to a fourth aspect of the present invention is characterized in that, in the appliance control system according to the third aspect, the storage unit stores the number of operation times for each of the set time periods, and in the case where the plurality of appliances, in which the environmental data have exceeded the threshold value, are present, the processing unit sequentially gives higher priorities to appliances in each of which the number of operation times, the number corresponding to the time period, is larger.

An application control system according to a fifth aspect of the present invention is characterized in that, in the appliance control system according to either one of the third and fourth aspects, the input unit is capable of setting the time periods while the storage unit stores the number of operation times.

An application control system according to a sixth aspect of the present invention is characterized in that, in the appliance control system according to any one of the first to fifth aspects, the storage unit stores arbitrary priority for each of the plurality of appliances, the arbitrary priority being arbitrarily set priority to be displayed on the display unit, and in the case where the plurality of appliances, in which the environmental data have exceeded the threshold value, are present, the processing unit sequentially gives still higher priorities to appliances in each of which the arbitrary priority is higher.

A seventh aspect of the present invention is summarized to be a remote controller including: a display unit that displays a list of a plurality of appliances as control targets; an input unit that receives an operation of controlling the appliances; a storage unit that stores a threshold value in environmental data of a surrounding environment for each of the plurality of appliances; and a processing unit that gives higher priority to an appliance in which the environmental data inputted from a sensor has exceeded a threshold value, the priority being concerned with a display order of the appliance on the display unit.

DESCRIPTION OF EMBODIMENTS

Next, a description is made of an embodiment of the present invention with reference to the drawings. In the following description referring to the drawings, the same or similar reference numerals are assigned to the same or similar portions. However, the embodiment to be shown below exemplifies devices and methods for embodying the technical spirit of the present invention, and exemplifies a system using these devices, and the technical spirit of the present invention is not specified to devices and methods, which are exemplified in the following embodiment, and to a system using these devices. The technical spirit of the present invention can be subjected to a variety of alterations within the technical scope described in the scope of claims.

(Appliance Control System)

Figure 1:
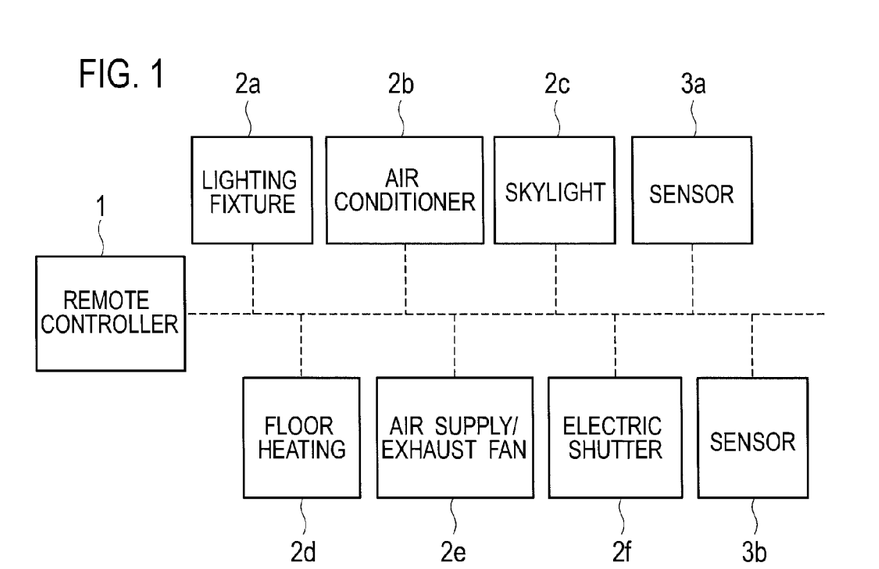
FIG. 1 is a schematic block diagram explaining a basic configuration of an appliance control system according to an embodiment of the present invention.

As shown in FIG. 1, an appliance control system according to the embodiment of the present invention includes: a remote controller 1; a plurality of appliances 2a, 2b, 2c, 2d, 2e and 2f as control targets by the remote controller 1; and sensors 3a and 3b. The remote controller 1 is a controller that controls operations of the appliances 2a to 2f. For example, the appliances 2a to 2f can be defined to be a variety of electrical appliances such as a lighting fixture, an air conditioner, an electric skylight, floor heating, an air supply/exhaust fan, an electric shutter, a water heater, an electric lock, a camera or a washing machine.

The sensors 3a and 3b detect the environmental data of a surrounding environment. For example, the sensors 3a and 3b are a temperature sensor, an illuminance sensor, a humidity sensor and the like. In this case, the sensors 3a and 3b detect temperature, humidity, illuminance and the like as the environmental data. The sensors 3a and 3b may be installed in spaces such as rooms and corridors, in which the appliances 2a to 2f are installed, or may be provided in the insides thereof. Besides this, data for detecting the environmental data may be provided in the inside of the remote controller 1.

Figure 2:
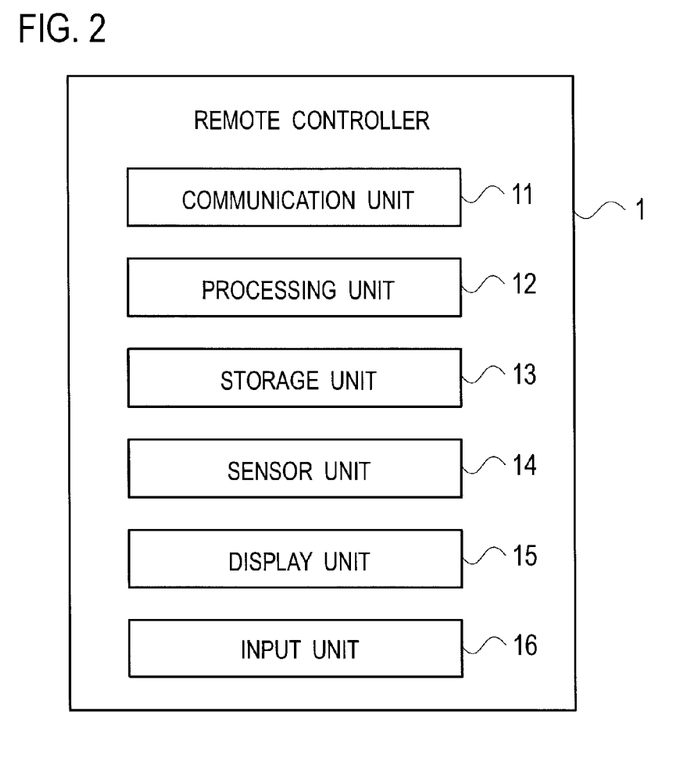
FIG. 2 is a schematic block diagram explaining a remote controller provided in the appliance control system according to the embodiment of the present invention.

As shown in FIG. 2, the remote controller 1 includes a communication unit 11, a processing unit 12, a storage unit 13, a sensor unit 14, a display unit 15, and an input unit 16. For example, the remote controller 1 is of a portable type, and can wirelessly transmit control signals for controlling the appliances 2a to 2f to the appliances 2a to 2f by the communication unit 11. The communication unit 11 communicably connects to the appliances 2a to 2f and the sensors 3a and 3b.

The processing unit 12 processes a variety of arithmetic operations to be performed by the respective units of the remote controller 1. The storage unit 13 stores a variety of data such as a program file and a temporarily file, which are necessary for processing by the processing unit 12. For example, the sensor unit 14 is composed of a sensor equivalent to the sensors 3a and 3b, and can detect the environmental data of the surrounding environment.

The display unit 15 is composed of a display device such as a liquid crystal display and an organic EL display. The input unit 16 is composed of input devices such as a touch sensor and a variety of switches, and receives an operation from a user for controlling the appliances 2a to 2f. The display unit 15 and the input unit 16 may be configured as a touch panel (15, 16) as a configuration to which an input device and a display device are applied.

Figure 3:
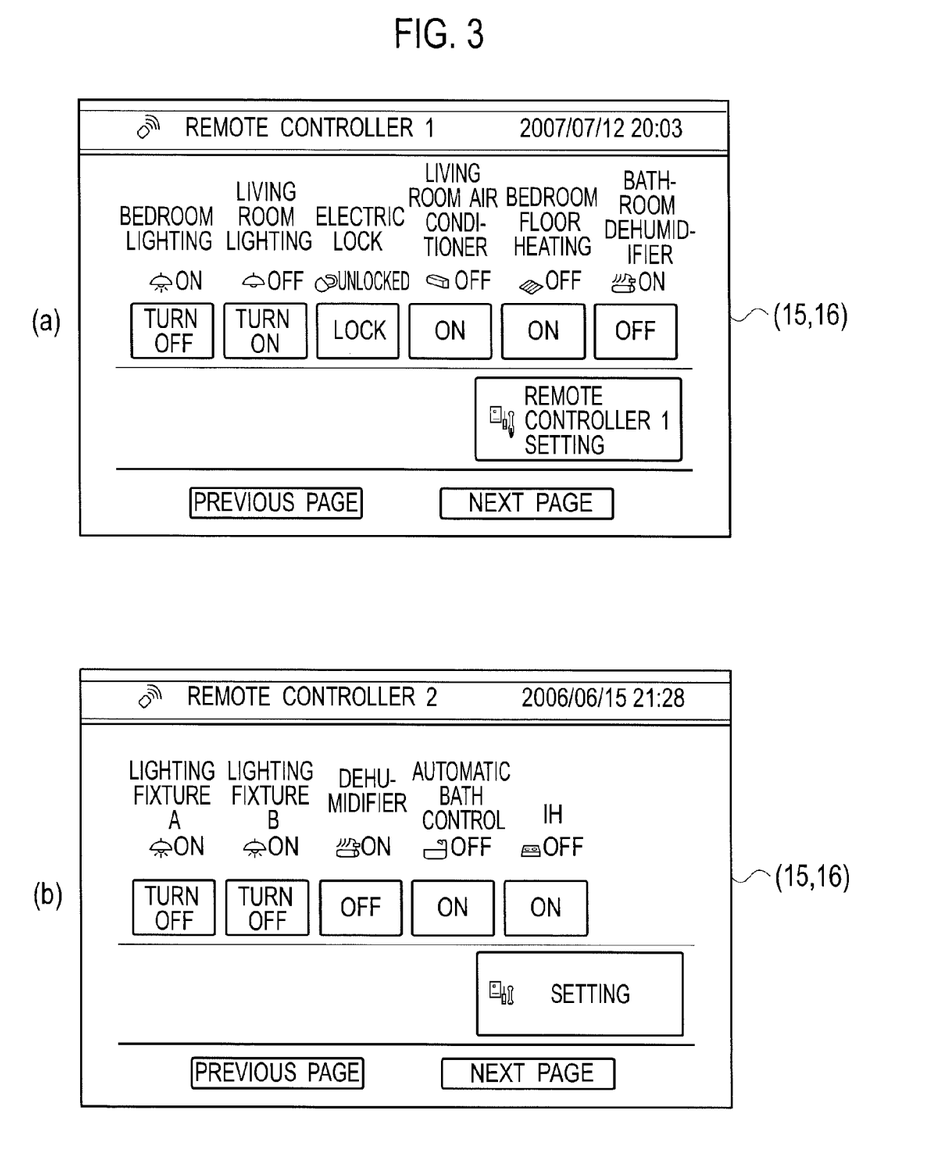
FIGS. 3A and 3B are an example of a display screen of a touch panel of the remote controller provided in the appliance control system according to the embodiment of the present invention.

For example, as shown in FIGS. 3A and 3B, such a display unit 15 of the touch panel (15, 16) displays a list of the appliances 2a to 2f as the control targets. In a case where the number of appliances 2a to 2f is large, and the list of the appliances 2a to 2f cannot be displayed at one time, the processing unit 12 generates plural pages of a display screen, and switches the pages, and thereby displays the list of the appliances 2a to 2f on the display unit 15 of the touch panel (15, 16). For example, the switching of the page is performed by input to the input unit 16 by the user.

The processing unit 12 sets priorities for the appliances 2a to 2f displayed on the display unit 15, and sequentially and preferentially displays the appliances with higher priorities. In an example shown in FIGS. 3A and 3B, the priorities are set in a descending order from a left end (bedroom lighting) to a right end (bathroom dehumidifier) in FIG. 3A showing a first page, and subsequently, from a left end (lighting A) to a right end (IH cooker) in FIG. 3B showing a second page. The user selects an appliance as the control target from the list, performs operation input to the input unit 16, and can thereby perform the desired control.

Figure 4:
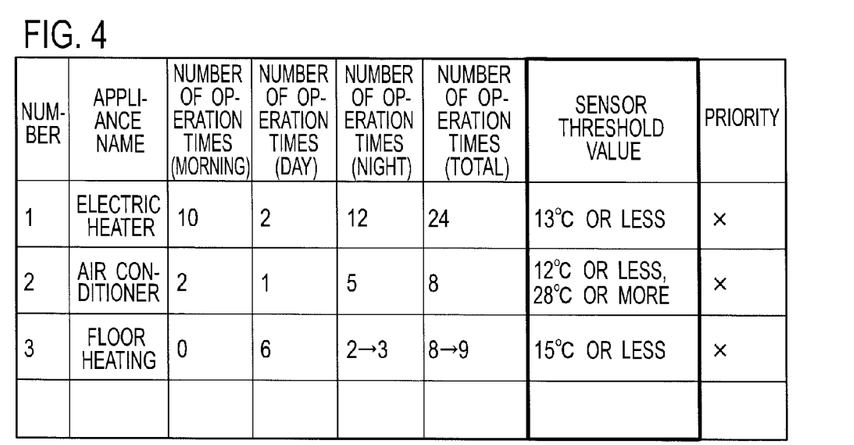
FIG. 4 is an example of illustrating a priority table for use in the appliance control system according to the embodiment of the present invention.
Figure 5:
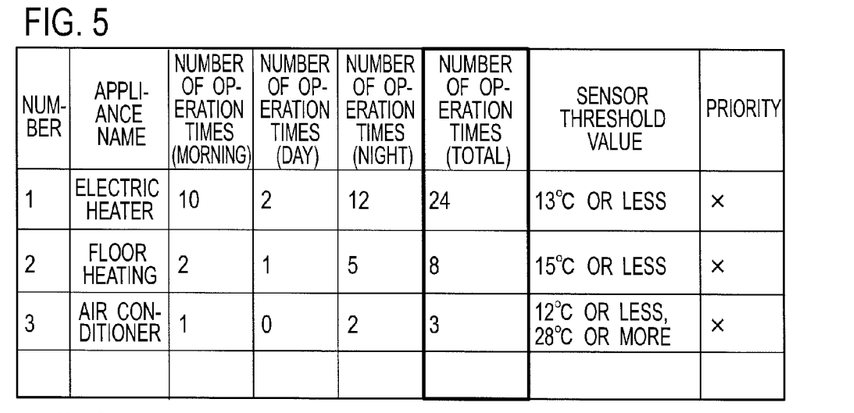
FIG. 5 is an example of illustrating the priority table for use in the appliance control system according to the embodiment of the present invention.

The storage unit 13 stores a priority table which the processing unit 12 uses for setting the priorities. For example, as shown in FIG. 4, the priority table stores a threshold value of the environmental data for each of the appliances 2a to 2f. In an example shown in FIG. 4, the environmental data is temperature, and for example, a threshold value of the appliance "electric heater" is "13° C. or less". The threshold value of the environmental data, which the storage unit 13 stores, may be appropriately changed and set by an operation input from the input unit 16. Besides, as shown in FIG. 5, for each of the appliances 2a to 2f, the priority table, which the storage unit 13 stores, stores the number of operation times of the input unit 16 to each of the appliances 2a to 2f, and the like.

Upon receiving the environmental data detected by the sensors 3a and 3b, the processing unit 12 refers to the priority table, which the storage unit 13 stores, and sets the priorities of display on the display unit 15 for the appliances 2a to 2f. That is to say, the processing unit 12 gives higher priority to an appliance in which the environmental data has exceeded the threshold value.

For example, in a case where the sensor 3 detects a temperature of 14° C. as the environmental data, it is the "floor heating" appliance in which the environmental data has exceeded "15° C. or less" as the threshold value. Hence, the processing unit 12 pushes up a row of the "floor heating" from a number "3" to a number "1", and gives higher priority thereto.

For example, a case is considered, where only two, which are "electric heater" and "air conditioner", are displayed as a first page of the list of the appliances on the display screen of the display unit 15, and "floor heating" is displayed as a second page thereof on the display screen. In this case, since the environmental data of "floor heating" has exceeded the threshold value, the priority of "floor heating" is set higher, and "floor heating" is displayed on the first page of the list of the appliances.

In a case where a plurality of the appliances, in which the environmental data has exceeded the threshold value, are present, the processing unit 12 can give still higher priority to an appliance having a still higher possibility to be a control target desired by the user. For example, as shown in FIG. 5, in a case where the environmental data is a temperature of 12° C., then in all of the appliances 2, the environmental data exceeds the threshold values, and all of the appliances 2 become targets to be given higher priorities.

The processing unit 12 refers to the number of operation times in the priority table, and further sets the priorities so that higher priorities can be given to the appliances in order from an appliance in which the number of operation times is larger. Hence, in the case where the plurality of appliances, in which the environmental data have exceeded the threshold values, are present, the processing unit 12 can preferentially display those of the appliances 2a to 2f, which are considered to have higher frequencies of use, on the display unit 15.

Figure 6:
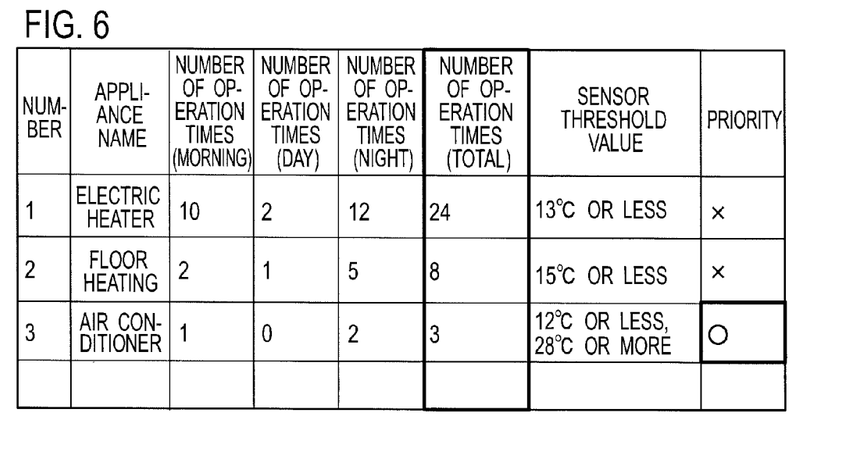
FIG. 6 is an example of illustrating the priority table for use in the appliance control system according to the embodiment of the present invention.

Moreover, in the priority table, arbitrary priority, which is arbitrary settable, may be set for each of the appliances 2a to 2f. For example, as shown in FIG. 6, in the priority table, the arbitrary priority (simply displayed as "priority" in FIG. 6 and the like) is set for the appliance "air conditioner". Even in a case where the temperature is 12° C. and the priorities are sequentially given to the appliances "electric heater", "floor heating" and "air conditioner" in order of a larger number of operation times, the processing unit 12 can give highest priority to "air conditioner" since the arbitrary priority is set for "air conditioner". In a case where the arbitrary priority has levels, the processing unit 12 may sequentially give still higher priority to appliances having higher arbitrary priorities.

Figure 7:
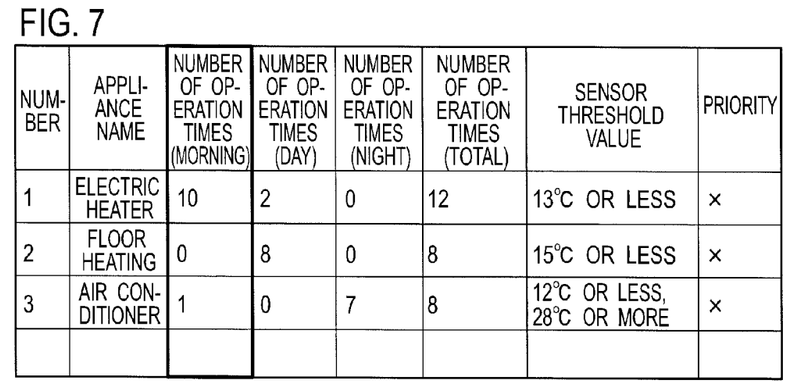
FIG. 7 is an example of illustrating the priority table for use in the appliance control system according to the embodiment of the present invention.
Figure 8:
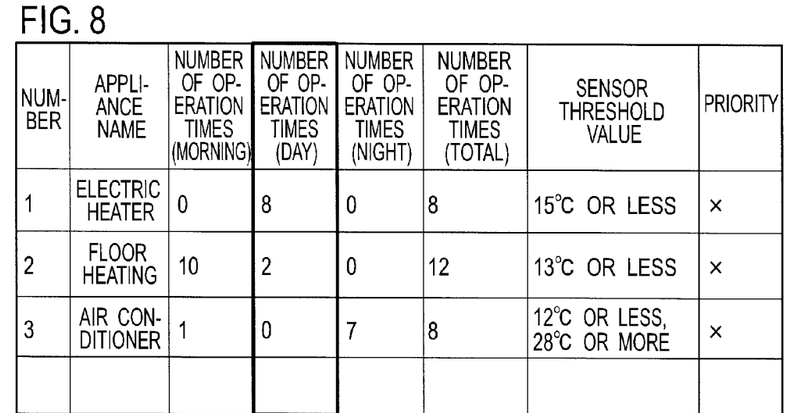
FIG. 8 is an example of illustrating the priority table for use in the appliance control system according to the embodiment of the present invention.
Figure 9:
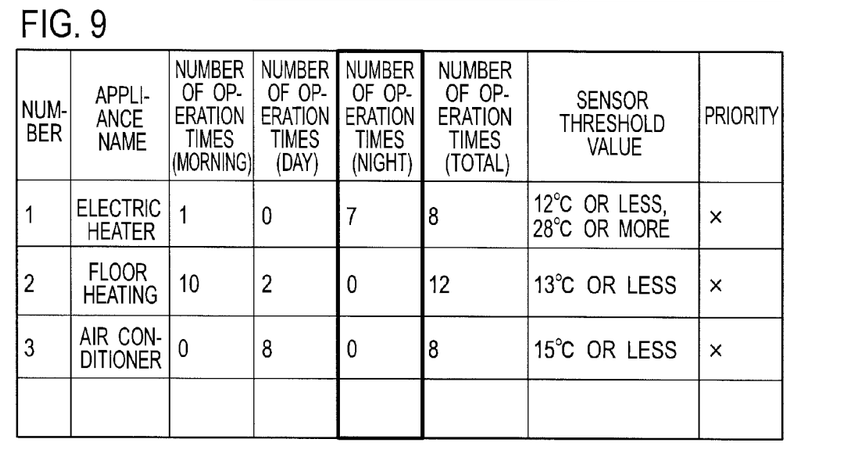
FIG. 9 is an example of illustrating the priority table for use in the appliance control system according to the embodiment of the present invention.

Moreover, items of "number of operation times" of the priority table may be stored for each of the time periods. For example, as shown in FIG. 7, FIG. 8 and FIG. 9, the time periods just need to be classified like "morning", "day" and "night", and the processing unit 12 just needs to refer to an item of "number of operation times" corresponding to a time period while the user is performing the operation. With regard to the time periods, for example, the morning can be set at a period from 6 am to 9 am, the day can be set at a period from 9 am to 16 am, and the night can be set at a period from 4 pm to 6 am. By input by the user from the input unit 16, it is possible to change and set the setting of the time periods, for example, such that the morning is 5 am to 8 am, that the day is 8 am to 5 pm, and that the night is 5 pm to 5 am.

For example, in a case where the user operates the remote controller 1 at 7 am, a time period of this time applies to "morning", and by referring to the number of operation times shown in FIG. 7, still higher priorities are sequentially given to "electric heater", "air conditioner" and "floor heating".

In accordance with the appliance control system according to this embodiment of the present invention, the appliance having a high possibility to be the control target desired by the user can be preferentially displayed, and accordingly, unnecessary operations can be omitted, and the convenience for the user can be enhanced.

Moreover, in accordance with the appliance control system according to this embodiment of the present invention, the threshold values, priorities and the like of the environmental data can be set by the input from the input unit, and accordingly, settings matched with a lifestyle of each user can be made, and the convenience for the user can be enhanced.

(Other Embodiments)

As above, the description has been made of the present invention based on the embodiment; however, it should not be understood that the description and the drawings, which form a part of this disclosure, limit the present invention. From this disclosure, varieties of alternative embodiments, examples and operation technologies will be obvious for those skilled in the art.

Each of the number of appliances 2a to 2f, the number of sensors 3a and 3b, and the like is exemplification, and is not limited to the number described in the embodiment of the present invention. Moreover, a communication system is not limited to such a system as described in the embodiment of the present invention, and a wired or wireless system can be appropriately selected.

As described above, it is a matter of course that the present invention incorporates a variety of embodiments and the like, which are not described herein. Hence, the technical scope of the present invention is determined only by the invention specifying items according to the scope of claims reasonable from the above description.

INDUSTRIAL APPLICABILITY

In accordance with the present invention, the appliance control system and the remote controller, which enhance the convenience for the user, can be provided.

REFERENCE SIGNS LIST

1 REMOTE CONTROLLER
2 APPLIANCE
3 SENSOR
11 COMMUNICATION UNIT
12 PROCESSING UNIT
13 STORAGE UNIT
15 DISPLAY UNIT
16 INPUT UNIT

The invention claimed is:

1. An appliance control system comprising:
one or more sensors to detect environmental data of an environment surrounding a plurality of appliances; and
a remote controller including:
a processing unit comprising a processor;
an input unit that receives input for controlling the plurality of appliances;
a storage unit comprising a memory that stores a respective environmental data threshold value and a respective priority value for each of the plurality of appliances;
a communication unit that connects to the plurality of appliances and to the one or more sensors and receives the detected environmental data from the one or more sensors, wherein a first appliance of the plurality of appliances for which the detected environmental data has exceeded the first appliance's environmental data threshold value is given a higher priority value than a second appliance of the plurality of appliances for which the detected environmental data has not exceeded the second appliance's environmental data threshold value; and
a display unit that displays a list of the plurality of appliances in order of descending priority value.

2. The appliance control system according to claim 1, wherein:
the storage unit stores, for each of the plurality of appliances, a number of times the respective appliance was operated; and
if there is a plurality of appliances for which the detected environmental data has exceeded the respective appliance's environmental data threshold value, then a first appliance among the plurality of appliances for which the detected environmental data has exceeded the first appliance's environmental data threshold value is given a higher priority value than a second appliance among the plurality of appliances for which the detected environmental data has exceeded the second appliance's environmental data threshold value when the number of times the first appliance was operated is greater than the number of times the second appliance was operated.

3. The appliance control system according to claim 1, wherein:
the storage unit stores, for each of the plurality of appliances, a number of times the respective appliance was operated during successive time slots of a 24-hour period; and
if there is a plurality of appliances for which the detected environmental data has exceeded the respective appliance's environmental data threshold value, then a first appliance among the plurality of appliances for which the detected environmental data has exceeded the first appliance's environmental data threshold value is given a higher priority value than a second appliance among the plurality of appliances for which the detected environmental data has exceeded the second appliance's environmental data threshold value when the number of times the first appliance was operated is greater than the number of times the second appliance was operated during a current time slot of the 24-hour period.

4. The appliance control system according to claim 3, wherein:
the input unit receives input configuring a duration of the time slots.

5. The appliance control system according to claim 1, wherein:
the input unit receives input for setting an arbitrary priority for each of the plurality of appliances;
the storage unit stores the respective arbitrary priority for each of the plurality of appliances; and
if there is a plurality of appliances for which the detected environmental data has exceeded the respective appliance's environmental data threshold value, then a first appliance among the plurality of appliances for which the detected environmental data has exceeded the first appliance's environmental data threshold value is given a higher priority value than a second appliance among the plurality of appliances for which the detected environmental data has exceeded the second appliance's environmental data threshold value when the arbitrary priority of the first appliance is higher than the arbitrary priority of the second appliance.

6. A non-transitory computer readable storage medium storing a program that when executed causes a computing system to perform a method of:
storing a respective environmental data threshold value and a respective priority value for each of a plurality of appliances;
connecting to the plurality of appliances and to one or more sensors, wherein the one or more sensors detect environmental data of an environment surrounding the plurality of appliances;
receiving the detected environmental data from the one or more sensors, wherein a first appliance of the plurality of appliances for which the detected environmental data has exceeded the first appliance's environmental data threshold value is given a higher priority value than a second appliance of the plurality of appliances for which the detected environmental data has not exceeded the second appliance's environmental data threshold value; and
displaying a list of the plurality of appliances in order of descending priority value.

7. The non-transitory computer readable storage medium according to claim 6, further comprising:
storing, for each of the plurality of appliances, a number of times the respective appliance was operated; and
if there is a plurality of appliances for which the detected environmental data has exceeded the respective appliance's environmental data threshold value, then a first appliance among the plurality of appliances for which the detected environmental data has exceeded the first appliance's environmental data threshold value is given a higher priority value than a second appliance among the plurality of appliances for which the detected environmental data has exceeded the second appliance's environmental data threshold value when the number of times the first appliance was operated is greater than the number of times the second appliance was operated.

8. The non-transitory computer readable storage medium according to claim 6, further comprising:
storing, for each of the plurality of appliances, a number of times the respective appliance was operated during successive time slots of a 24-hour period; and
if there is a plurality of appliances for which the detected environmental data has exceeded the respective appliance's environmental data threshold value, then a first appliance among the plurality of appliances for which the detected environmental data has exceeded the first appliance's environmental data threshold value is given a higher priority value than a second appliance among the plurality of appliances for which the detected environmental data has exceeded the second appliance's environmental data threshold value when the number of times the first appliance was operated is greater than the number of times the second appliance was operated during a current time slot of the 24-hour period.

9. The non-transitory computer readable storage medium according to claim 8, further comprising:
receiving input configuring a duration of the time slots.

10. The non-transitory computer readable storage medium according to claim 6, further comprising:
receiving input for setting an arbitrary priority for each of the plurality of appliances;
storing, for each of the plurality of appliances, the respective arbitrary priority; and
if there is a plurality of appliances for which the detected environmental data has exceeded the respective appliance's environmental data threshold value, then a first appliance among the plurality of appliances for which the detected environmental data has exceeded the first appliance's environmental data threshold value is given a higher priority value than a second appliance among the plurality of appliances for which the detected environmental data has exceeded the second appliance's environmental data threshold value when the arbitrary priority of the first appliance is higher than the arbitrary priority of the second appliance.

11. A method of:
   storing a respective environmental data threshold value and a respective priority value for each of a plurality of appliances;
   connecting to the plurality of appliances and to one or more sensors, wherein the one or more sensors detect environmental data of an environment surrounding the plurality of appliances;
   receiving the detected environmental data from the one or more sensors, wherein a first appliance of the plurality of appliances for which the detected environmental data has exceeded the first appliance's environmental data threshold value is given a higher priority value than a second appliance of the plurality of appliances for which the detected environmental data has not exceeded the second appliance's environmental data threshold value; and
   displaying a list of the plurality of appliances in order of descending priority value.

12. The method according to claim 11, further comprising:
   storing, for each of the plurality of appliances, a number of times the respective appliance was operated; and
   if there is a plurality of appliances for which the detected environmental data has exceeded the respective appliance's environmental data threshold value, then a first appliance among the plurality of appliances for which the detected environmental data has exceeded the first appliance's environmental data threshold value is given a higher priority value than a second appliance among the plurality of appliances for which the detected environmental data has exceeded the second appliance's environmental data threshold value when the number of times the first appliance was operated is greater than the number of times the second appliance was operated.

13. The method according to claim 11, further comprising:
   storing, for each of the plurality of appliances, a number of times the respective appliance was operated during successive time slots of a 24-hour period; and
   if there is a plurality of appliances for which the detected environmental data has exceeded the respective appliance's environmental data threshold value, then a first appliance among the plurality of appliances for which the detected environmental data has exceeded the first appliance's environmental data threshold value is given a higher priority value than a second appliance among the plurality of appliances for which the detected environmental data has exceeded the second appliance's environmental data threshold value when the number of times the first appliance was operated is greater than the number of times the second appliance was operated during a current time slot of the 24-hour period.

14. The method according to claim 13, further comprising:
   receiving input configuring a duration of the time slots.

15. The method according to claim 11, further comprising:
   receiving input for setting an arbitrary priority for each of the plurality of appliances;
   storing, for each of the plurality of appliances, the respective arbitrary priority; and
   if there is a plurality of appliances for which the detected environmental data has exceeded the respective appliance's environmental data threshold value, then a first appliance among the plurality of appliances for which the detected environmental data has exceeded the first appliance's environmental data threshold value is given a higher priority value than a second appliance among the plurality of appliances for which the detected environmental data has exceeded the second appliance's environmental data threshold value when the arbitrary priority of the first appliance is higher than the arbitrary priority of the second appliance.

* * * * *